US012086915B2

(12) United States Patent
Saito

(10) Patent No.: US 12,086,915 B2
(45) Date of Patent: Sep. 10, 2024

(54) AVATAR DISPLAY DEVICE, AVATAR DISPLAY SYSTEM, AVATAR DISPLAY METHOD, AND AVATAR DISPLAY PROGRAM

(71) Applicant: DWANGO Co., Ltd., Tokyo (JP)

(72) Inventor: Hiroaki Saito, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 97 days.

(21) Appl. No.: 17/792,978

(22) PCT Filed: Jan. 20, 2021

(86) PCT No.: PCT/JP2021/001798
§ 371 (c)(1),
(2) Date: Jul. 14, 2022

(87) PCT Pub. No.: WO2021/153367
PCT Pub. Date: Aug. 5, 2021

(65) Prior Publication Data
US 2023/0049410 A1    Feb. 16, 2023

(30) Foreign Application Priority Data

Jan. 30, 2020 (JP) ................................. 2020-013451

(51) Int. Cl.
*G06T 13/00*    (2011.01)
*A63F 13/56*    (2014.01)
(Continued)

(52) U.S. Cl.
CPC .............. *G06T 13/00* (2013.01); *A63F 13/56* (2014.09); *A63F 13/58* (2014.09); *G06F 3/0484* (2013.01);
(Continued)

(58) Field of Classification Search
CPC ..... G06T 13/00; G06T 2213/12; A63F 13/58; A63F 13/56; G06F 3/0484; G06F 13/00; H04N 7/15; H04N 21/258
See application file for complete search history.

(56) References Cited

U.S. PATENT DOCUMENTS

| | | | | |
|---|---|---|---|---|
| 2010/0081508 A1* | 4/2010 | Bhogal | ................... | A63F 13/75 |
| | | | | 463/40 |
| 2011/0107239 A1* | 5/2011 | Adoni | ..................... | A63F 13/60 |
| | | | | 726/8 |

(Continued)

FOREIGN PATENT DOCUMENTS

| | | |
|---|---|---|
| JP | 2001-160154 A | 6/2001 |
| JP | 2005-328854 A | 12/2005 |

(Continued)

OTHER PUBLICATIONS

International Search Report mailed Apr. 13, 2021, in corresponding to International Application No. PCT/JP2021/001798; 5 pages (with English Translation).

*Primary Examiner* — YuJang Tswei
(74) *Attorney, Agent, or Firm* — Maier & Maier, PLLC

(57) ABSTRACT

An avatar display device with: a storage device for storing passive permission data including a permission flag indicating permission or denial of a passive avatar in relation to an action of an active avatar with respect to the passive avatar; and an output unit which, if the action from the active avatar with respect to the passive avatar is detected, and the permission flag in the passive permission data indicates permission, outputs data for displaying, on an active terminal and a passive terminal, moving image data in which the passive avatar accepts the action of the active avatar.

8 Claims, 4 Drawing Sheets

(51) Int. Cl.
*A63F 13/58* (2014.01)
*G06F 3/0484* (2022.01)
*G06F 13/00* (2006.01)
*H04N 7/15* (2006.01)
*H04N 21/258* (2011.01)

(52) U.S. Cl.
CPC .......... *G06F 13/00* (2013.01); *G06T 2213/12* (2013.01); *H04N 7/15* (2013.01); *H04N 21/258* (2013.01)

(56) References Cited

U.S. PATENT DOCUMENTS

| | | | |
|---|---|---|---|
| 2013/0047217 A1* | 2/2013 | Shuster | G06F 40/143 726/4 |
| 2015/0200950 A1* | 7/2015 | Meunier | G06F 21/10 726/4 |
| 2016/0189077 A1* | 6/2016 | Azmoon | G06Q 10/109 705/7.26 |
| 2016/0300387 A1* | 10/2016 | Ziman | G06F 3/165 |
| 2019/0108686 A1* | 4/2019 | Spivack | G06Q 30/0277 |
| 2019/0217192 A1* | 7/2019 | Fajt | A63F 13/73 |
| 2020/0155930 A1* | 5/2020 | Wang | A63F 13/58 |
| 2021/0011607 A1* | 1/2021 | Ziman | G06T 19/003 |
| 2021/0074064 A1* | 3/2021 | Iyer | G02B 27/017 |

FOREIGN PATENT DOCUMENTS

| | | |
|---|---|---|
| JP | 2010-239991 A | 10/2010 |
| JP | 2011-031050 A | 2/2011 |
| JP | 2013-131119 A | 7/2013 |

\* cited by examiner

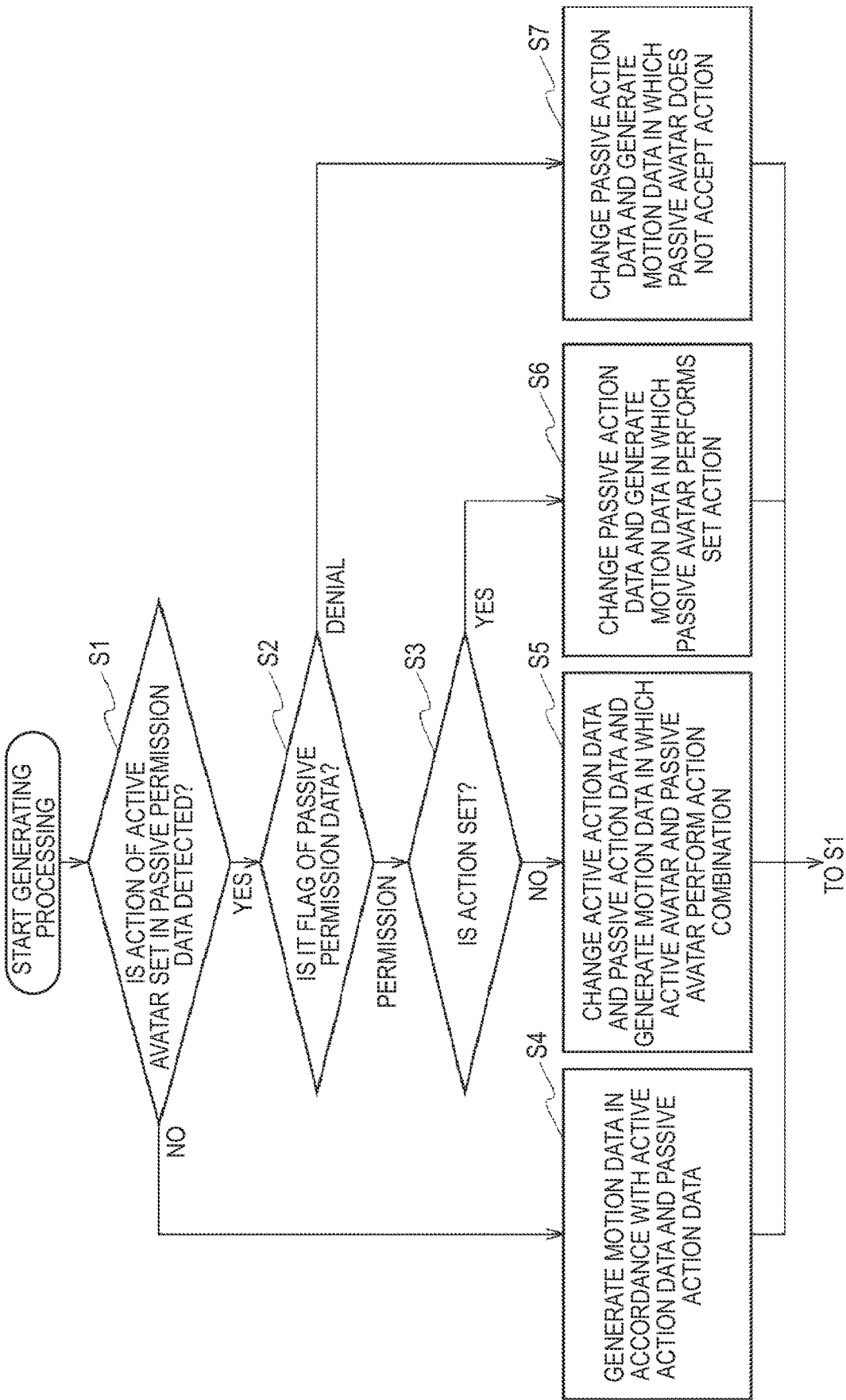

AVATAR DISPLAY DEVICE, AVATAR DISPLAY SYSTEM, AVATAR DISPLAY METHOD, AND AVATAR DISPLAY PROGRAM

TECHNICAL FIELD

The present invention relates to an avatar display device, an avatar display system, an avatar display method, and an avatar display program for displaying moving image data of a virtual space on an active terminal and a passive terminal.

BACKGROUND ART

As one of communication between users using a communication terminal, there is a method for allowing an avatar that is the alter ego of the user to act in a virtual space. The avatar acts in the virtual space in accordance with a manipulation that is input by the user. In addition, in the virtual space, avatars of a plurality of users perform actions corresponding to each other, and thus, an action combination of the plurality of avatars, such as a handshake, can be performed.

In addition, there is an avatar display device in which when an avatar satisfies a predetermined condition, the avatar is expressed with a default animation (Patent Document 1).

CITATION LIST

Patent Document

Patent Document 1: JP-A-2001-160154

SUMMARY OF THE INVENTION

Technical Problem

By each of the users allowing the avatars to suitably act, the avatars perform the actions corresponding to each other, and the action combination such as a handshake can be attained. However, in order to attain the action combination, it is necessary for each of the users to allow the own avatar to act by adjusting the position and the state while grasping the position and the state of the avatar of the other person, and thus, it may be difficult for each of the users to allow each of the avatars to perform the corresponding action.

In Patent Document 1, the avatar is expressed with the default animation on the basis of a distance from the other avatar, or the like, but the action combination of the plurality of avatars is not disclosed.

Accordingly, an object of the invention is to provide an avatar display device, an avatar display system, an avatar display method, and an avatar display program for displaying moving image data in which avatars perform actions corresponding to each other.

Solution to Problem

In order to attain the object, a first feature of the invention relates to an avatar display device that is connected to an active terminal inputting an action instruction of an active avatar acting in a virtual space and a passive terminal inputting an action instruction of a passive avatar acting in the virtual space, and displays moving image data of the virtual space on the active terminal and the passive terminal. The avatar display device according to the first feature of the invention includes a storage device storing passive permission data including a permission flag indicating permission or denial of the passive avatar in relation to an action from the active avatar with respect to the passive avatar, and an output unit outputting data for displaying the moving image data in which the passive avatar accepts the action of the active avatar on the active terminal and the passive terminal when the action from the active avatar with respect to the passive avatar is detected, and the permission flag indicates permission in the passive permission data.

The action may be an action for the active avatar to prompt the action of the passive avatar in order for an action combination that is established by the active avatar and the passive avatar performing actions corresponding to each other.

The passive permission data may further include the action of the passive avatar when the permission flag indicates permission, and in the moving image data, the passive avatar may perform an action associated with the passive permission data in relation to the action of the active avatar.

When the action from the active avatar with respect to the passive avatar is detected, and the permission flag in relation to the action is not set in the passive permission data, in the moving image data, it may be indicated that the active avatar performs the action in relation to the passive avatar.

When the action from the active avatar with respect to the passive avatar is detected, and the permission flag for the action of the passive permission data indicates denial, in the moving image data, it may be indicated that the passive avatar does not accept the action of the active avatar.

The passive permission data may associate the permission flag indicating whether or not the passive avatar permits the action from the active avatar with the action from the active avatar with respect to the passive avatar in the virtual space, for each portion of the active avatar, and when the action from the active avatar with respect to a predetermined portion of the passive avatar is detected, and the permission flag corresponding to the predetermined portion indicates permission in the passive permission data, in the moving image data, it may be indicated that the passive avatar accepts the action of the active avatar.

A second feature of the invention relates to an avatar display system including an active terminal inputting an action instruction of an active avatar acting in a virtual space, a passive terminal inputting an action instruction of a passive avatar acting in the virtual space, and an avatar display device that is connected to the active terminal and the passive terminal, and displays moving image data of the virtual space on the active terminal and the passive terminal. In the avatar display system according to the second feature of the invention, the avatar display device includes a storage device storing passive permission data including a permission flag indicating permission or denial of the passive avatar in relation to an action from the active avatar with respect to the passive avatar, and an output unit outputting data for displaying the moving image data in which the passive avatar accepts the action of the active avatar on the active terminal and the passive terminal when the action from the active avatar with respect to the passive avatar is detected, and the permission flag indicates permission in the passive permission data, and the active terminal and the passive terminal display the moving image data.

A third feature of the invention relates to an avatar display method to be used in an avatar display device that is connected to an active terminal inputting an action instruction of an active avatar acting in a virtual space and a passive terminal inputting an action instruction of a passive avatar acting in the virtual space, and displays moving image data of the virtual space on the active terminal and the passive terminal. The avatar display method according to the third feature of the invention includes a step for a computer to store passive permission data including a permission flag indicating permission or denial of the passive avatar in relation to an action from the active avatar with respect to the passive avatar in a storage device, and a step for the computer to output data for displaying the moving image data in which the passive avatar accepts the action of the active avatar on the active terminal and the passive terminal when the action from the active avatar with respect to the passive avatar is detected, and the permission flag indicates permission in the passive permission data.

A fourth feature of the invention relates to an avatar display program to be used in an avatar display device that is connected to an active terminal inputting an action instruction of an active avatar acting in a virtual space and a passive terminal inputting an action instruction of a passive avatar acting in the virtual space, and displays moving image data of the virtual space on the active terminal and the passive terminal. The avatar display program according to the fourth feature of the invention allows a computer to function as a storage unit storing passive permission data including a permission flag indicating permission or denial of the passive avatar in relation to an action from the active avatar with respect to the passive avatar, and an output unit outputting data for displaying the moving image data in which the passive avatar accepts the action of the active avatar on the active terminal and the passive terminal when the action from the active avatar with respect to the passive avatar is detected, and the permission flag indicates permission in the passive permission data.

Advantageous Effects of the Invention

According to the invention, it is possible to provide an avatar display device, an avatar display system, an avatar display method, and an avatar display program for displaying moving image data in which avatars perform actions corresponding to each other.

BRIEF DESCRIPTION OF THE DRAWINGS

FIG. 6 is a flowchart describing generating processing of a generating unit.

MODE FOR CARRYING OUT THE INVENTION

Figure 1:
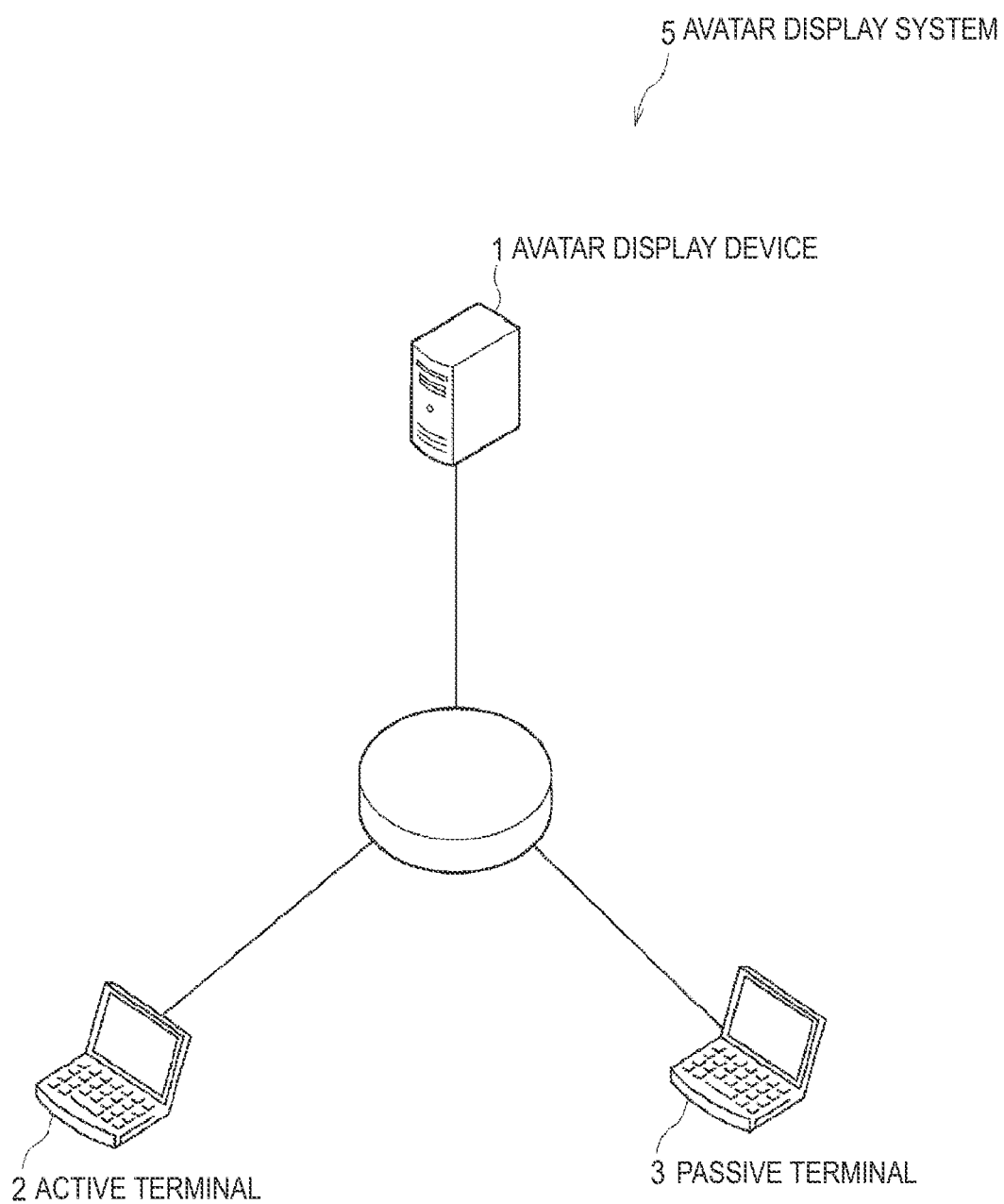
FIG. 1 is a diagram describing a system configuration of an avatar display system according to an embodiment of the invention.

Next, embodiments of the invention will be described with reference to the drawings. In the following description of the drawings, the same or similar reference numerals will be applied to the same or similar parts.

(Avatar Display System)

An avatar display system 5 according to an embodiment of the invention will be described with reference to FIG. 1. The avatar display system 5 includes an avatar display device 1, an active terminal 2, and a passive terminal 3. The avatar display device 1 and the active terminal 2 are capable of communicating with each other through a communication network. The avatar display device 1 and the passive terminal 3 are capable of communicating with each other through a communication network. In the embodiment of the invention, a case in which the avatar display system 5 includes two terminals of the active terminal 2 and the passive terminal 3 as a user terminal will be described, but the number of user terminals is not limited.

Each of the active terminal 2 and the passive terminal 3 inputs an instruction for the action of an avatar acting in a virtual space to the avatar display device. The active terminal 2 inputs an action instruction of an active avatar acting in the virtual space. The passive terminal 3 inputs an action instruction of a passive avatar acting in the virtual space.

An instruction method of the action may be an arbitrary method. For example, a user may input the action instruction of the avatar to the active terminal 2 or the passive terminal 3 by using an input device such as a keyboard and a mouse. There is also a method of using motion capturing for specifying the motion of the user by attaching a marker to the body of the user and by tracking the position of the marker. The user may input the motion of the user that is specified by the motion capturing to the active terminal 2 or the passive terminal 3 as the action instruction of the avatar that is input by the user.

In addition, the active terminal 2 and the passive terminal 3 display moving image data to the display device in accordance with the data received from the avatar display device 1. In a case where the avatar display device 1 outputs the moving image data, the active terminal 2 and the passive terminal 3 display the output moving image data. In a case where the avatar display device 1 outputs data for displaying the moving image data, the active terminal 2 and the passive terminal 3 generate the moving image data in accordance with the output data, and display the generated moving image data.

The avatar display device 1 allows the avatar to act in the virtual space in accordance with the action instruction of the avatar that is received from the active terminal 2 and the passive terminal 3, and displays the moving image data of the virtual space on the active terminal 2 and the passive terminal 3.

A method for the avatar display device 1 to display the moving image data on the user terminal may be an arbitrary method. For example, the avatar display device 1 may generate the moving image data obtained by photographing the virtual space with a virtual camera, and may distribute the moving image data to the user terminal. Alternatively, the avatar display device 1 may generate motion data that is capable of rendering the virtual space and transmit the motion data to the user terminal, and the user terminal may generate the moving image data of the virtual space by rendering the motion data and display the moving image data.

In the embodiment of the invention, the avatar display device 1 not only allows the avatar to act in the virtual space in accordance with the instruction from the user terminal but also allows the avatar to execute an action different from the instruction from the user terminal, specifically, an action combination of a plurality of avatars, under a predetermined condition.

The action combination is an action that is established by the active avatar and the passive avatar performing actions corresponding to each other. The action combination is established by each of the plurality of avatars striking the corresponding pose in positions corresponding to each other and performing the corresponding motion. The action combination, for example, is a handshake, high five, a hug, bridal carry, group gymnastics, and the like.

In the embodiment of the invention, a case in which the active avatar and the passive avatar perform the action combination by the active avatar asking the passive avatar to perform the action combination, such as the active avatar requesting a handshake to the passive avatar, will be described. Note that, in the embodiment of the invention, the action combination of two avatars of the active avatar and the passive avatar will be described, but the invention is not limited thereto. The number of avatars attaining the action combination is not limited, and the action combination may be attained by three or more avatars.

In order to perform the action combination, it is necessary that each of the plurality of avatars performs a suitable action in a suitable position. However, it may be difficult for the user performing a manipulation while looking at the moving image data of the virtual space to input such a detailed action instruction.

Therefore, the avatar display device 1 displays the moving image data in which the active avatar and the passive avatar perform the action combination under a predetermined condition, regardless of the action instruction of the active avatar and the passive avatar that is input from the active terminal 2 and the passive terminal 3. Accordingly, the user allows the own avatar to perform the corresponding action of the action combination without inputting the detailed action instruction, and thus, is capable of easily attaining the action combination between the avatar of the other user. Accordingly, the avatar display device 1 is capable of attaining smooth communication using the avatar in the virtual space.

(Avatar Display Device)

Figures 2, 3:
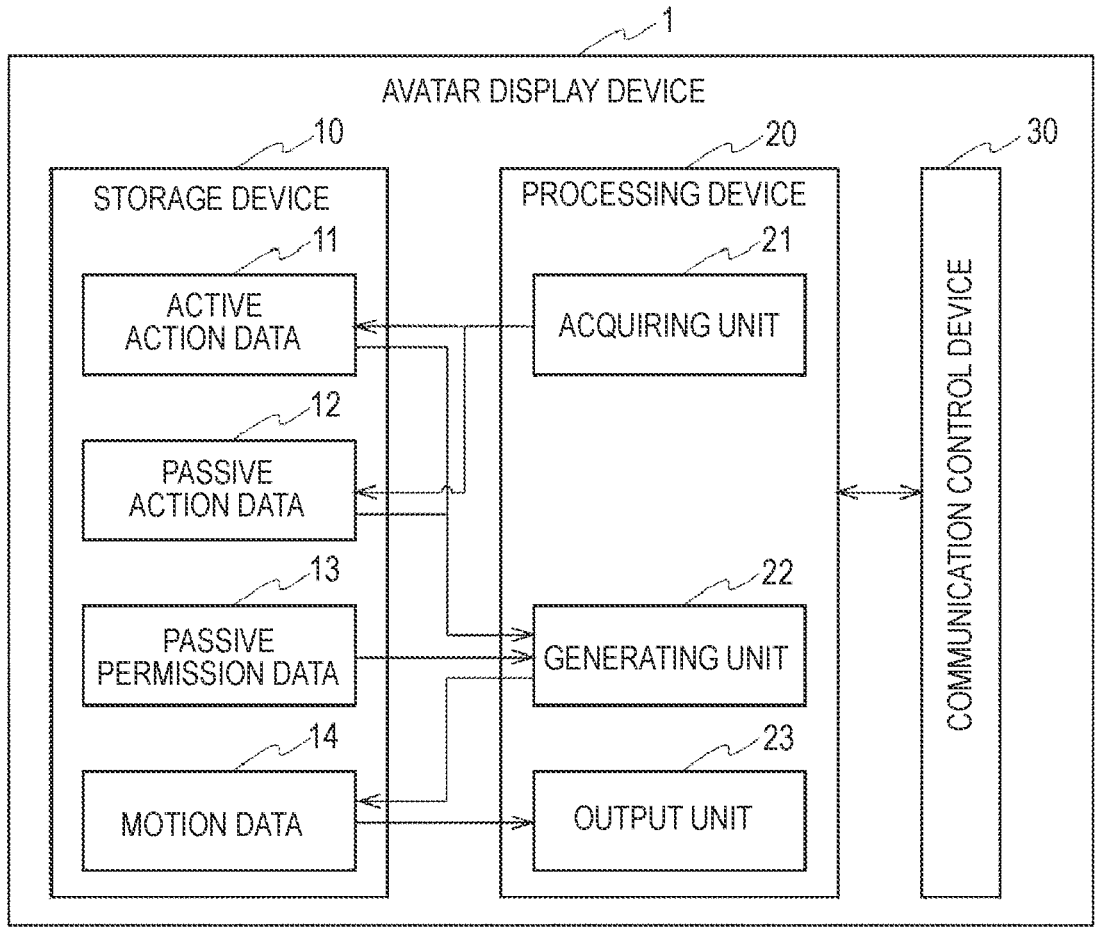
FIG. 2 is a diagram describing a hardware configuration and a function block of an avatar display device according to the embodiment of the invention.
FIG. 3 is a diagram describing a data structure of passive permission data and an example of the data.

The avatar display device 1 according to the embodiment of the invention will be described with reference to FIG. 2. The avatar display device 1 is a general computer including a storage device 10, a processing device 20, and a communication control device 30. The general computer executes an avatar display program, and thus, functions illustrated in FIG. 2 are attained.

The storage device 10 is a read only memory (ROM), a random access memory (RAM), a hard disk, a solid state drive (SSD), and the like, and stores various data items for the processing device 20 to execute processing, such as input data, output data, and intermediate data. The processing device 20 is a central processing unit (CPU), and executes the processing in the avatar display device 1 by reading and writing the data stored in the storage device 10, or by inputting and outputting the data with respect to the communication control device 30. The communication control device 30 is an interface for connecting to each of the active terminal 2 and the passive terminal 3 such that communication can be performed on each other.

The storage device 10 stores the avatar display program, and also stores active action data 11, passive action data 12, passive permission data 13, and motion data 14.

The active action data 11 is data of the action instruction in relation to the active avatar that is received from the active terminal 2. The active action data 11 is sequentially updated in accordance with the action instruction input from the active terminal 2.

The passive action data 12 is data of the action instruction in relation to the passive avatar that is received from the passive terminal 3. The passive action data 12 is sequentially updated in accordance with the action instruction input from the passive terminal 3.

The passive permission data 13 includes a permission flag indicating permission or denial of the passive avatar in relation to an action from the active avatar with respect to the passive avatar. In the passive permission data 13, the intention of the user of the passive terminal 3 of whether or not to accept the action of the passive avatar is set in advance. In a case where the active avatar requests the action combination in relation to the passive avatar, in the passive permission data 13, whether or not the passive avatar accepts the request of the active avatar is set. In the passive permission data 13, the permission flag is provided for each action of the active avatar. The passive permission data 13 may be set for each of the avatars.

In the passive permission data 13, the permission flag indicating whether or not the passive avatar permits the action from the active avatar may be further associated with the action from the active avatar with respect to the passive avatar in the virtual space, for each portion of the active avatar. The portion of the active avatar, for example, is a part configuring the active avatar, such as the right hand, the left hand, and the head. For example, in a case where the active avatar requests a touch on the right hand of the passive avatar, a permission flag is set, and in a case where the active avatar requests a touch on the back hip of the passive avatar, a denial flag is set.

The passive permission data 13 may further include the action of the passive avatar in a case where the permission flag indicates permission. The action of the passive avatar is the action of the passive avatar in a case where the action of the active avatar is accepted.

In general, a freedom degree of the shape of the avatar in the virtual space is high, and each of the users is capable of selecting an arbitrary shape. Accordingly, each of the avatars may have a different size, or there may be an avatar having a shape different from that of a person. Communicating with another avatar by a method different from communication between people is considered in accordance with the shape of the avatar. Therefore, in a case where a predetermined action is received from another avatar, the action performed by the passive avatar is defined as the "Action" of the passive permission data 13. Note that, the "Action" set in the passive permission data 13 is not limited to an action performed by a person, and includes arbitrary action that can be implemented in the avatar, such as increasing and decreasing.

The passive permission data 13 may be generated on the basis of the setting of the user of the passive terminal 3. In addition, the passive permission data 13 may be data of default setting generated by the system in advance, or may be data in which the default setting is changed by the user of the passive terminal 3.

The passive permission data 13, for example, as illustrated in FIG. 3, is data associated with the value of each item of "Active Action Type", "Portion of Passive Avatar", "Flag", and "Action".

"Active Action Type" is the type of action combination that is requested in relation to the passive avatar from the active avatar.

"Portion of Passive Avatar" is a portion in which the active avatar requests the action combination. An action that is requested to the passive avatar from the active avatar can be specified by "Active Action Type" and "Portion of Passive Avatar". In the example illustrated in FIG. 3, in a case where the active action type is a handshake and the portion of the passive avatar is the right hand, it is indicated that the active avatar requests "Handshake" with "Right Hand" of the passive avatar.

"Flag" indicates whether the action of the passive avatar that is requested from the active avatar is permitted or denied by the passive avatar. In "Flag", any one of two values of "Permission" and "Denial" may be set. By setting whether to permit or deny the request of the active avatar in advance, an action that the user of the passive terminal 3 in the virtual space disfavors is not performed in relation to the passive avatar.

In addition, in "Flag", any one of three values including "Pending" in addition to "Permission" and "Denial" may be set. "Pending" may include a null state in which neither "Permission" nor "Denial" is set. "Pending" may indicate waiting for "Permission", "Denial", or an instruction of the action of the passive avatar from the passive terminal 3, or may perform a default action.

"Action" is the action of the passive avatar when the active avatar requests a predetermined action. In the example illustrated in FIG. 3, in a case where permission is set in "Flag", the passive avatar performs an action associated with "Action". At this time, the passive permission data 13 may be associated with motion data for allowing the avatar to act. In a case where permission is set in "Flag" and nothing is set in "Action", the default action is performed.

In the example illustrated in FIG. 3, "Suggest Handshake with Left Hand" is set in "Action" in a case where the active avatar requests "Handshake" with "Right Hand" of the passive avatar. It is difficult for an avatar having a tool such as a weapon on the right hand to do a handshake with the right hand as with people. In such a case, the passive avatar performs an action of "Suggest Handshake with Left Hand" such as holding out the left hand. In addition, even in a case where the avatar has the weapon on the right hand, an arbitrary action such as performing "Handshake after Removing Weapon on Right Hand" may be associated.

In addition, in the example illustrated in FIG. 3, "Action" in a case where the active avatar requests "High Five" with "Right Hand" of the passive avatar includes "Change Avatar Size in Response to Active Avatar". In a case where the size of the passive avatar is excessively large or excessively small in relation to the size of the active avatar, it is difficult for the active avatar and the passive avatar to perform high five. Therefore, in a case where the passive avatar is requested to perform high five from the active avatar, the size of the passive avatar is changed in response to the size of the active avatar, and then, the action of high five is performed.

An action example is not limited to the example illustrated in FIG. 3. For example, in a case where passive avatar has no hands, "Grow Right Hand" may be set in "Action". In a case where the active avatar requests a handshake to the passive avatar, in the moving image data, the right hand of the passive avatar is grown, and the active avatar and the passive avatar do a handshake with the right hand.

Note that, "Portion of Passive Avatar" and "Action" may be an arbitrary item.

The motion data 14 is data for rendering the moving image data of the state of the virtual space, in the active terminal 2 and the passive terminal 3. In the embodiment of the invention, a case in which the avatar display device 1 outputs the motion data 14 will be described, and the moving image data generated from the motion data 14 may be output.

The processing device 20 includes an acquiring unit 21, a generating unit 22, and an output unit 23.

The acquiring unit 21 acquires the action instruction of the active avatar from the active terminal 2 and stores the action instruction in the active action data 11, and acquires the action instruction of the passive avatar from the passive terminal 3 and stores the action instruction in the passive action data 12.

The generating unit 22 generates data for displaying the moving image data on the active terminal 2 and the passive terminal 3. The generating unit 22 specifies the action of the active avatar on the basis of the active action data 11, and specifies the action of the passive avatar on the basis of the passive action data 12. The generating unit 22 generates the data for displaying the moving image data indicating a state in which the active avatar and the passive avatar act in the virtual space, in accordance with the specified action of the active avatar and the passive avatar.

The data for displaying the moving image data may be data of an instruction for displaying the moving image data. At this time, the generating unit 22 also generates the moving image data in addition to the data of the instruction. In addition, the data for displaying the moving image data may be data for rendering the moving image data by the active terminal 2 and the passive terminal 3. The data for rendering the moving image data, for example, is data for specifying the virtual space, data for specifying the form and the action of the active avatar and the passive avatar, and the like.

The output unit 23 transmits the data generated by the generating unit 22 to the active terminal 2 and the passive terminal 3 in order to display the moving image data on the active terminal 2 and the passive terminal 3. In a case where the output unit 23 outputs the moving image data, the active terminal 2 and the passive terminal 3 regenerate the moving image data transmitted from the output unit 23 on the display device. In a case where the output unit 23 outputs the data for rendering the moving image data, the active terminal 2 and the passive terminal 3 render the transmitted data, generate the moving image data indicating a state in which the active avatar and the passive avatar act in the virtual space, and regenerate the moving image data on the display device.

(Generating Unit)

When the generating unit 22 according to the embodiment of the invention generates the data for displaying the moving image data on the active terminal 2 and the passive terminal 3, in the moving image data, an action different from the action indicated by the active action data 11 and the passive action data 12 is performed under a predetermined condition.

Specifically, in a case where the action from the active avatar with respect to the passive avatar is detected, and the permission flag indicates permission in the passive permission data, the generating unit 22 generates the data for displaying the moving image data in which the passive avatar accepts the action of the active avatar on the active terminal 2 and the passive terminal 3. In the embodiment of the invention, the data for displaying the moving image data on the active terminal 2 and the passive terminal 3 is the motion data 14.

First, the generating unit 22 detects that the active avatar performs an action for the active avatar to prompt the action of the passive avatar in order for the action combination, from the status of the virtual space, the status of the active avatar, and the like. The action combination is any one of "Action" set in the passive permission data 13. The generating unit 22 detects that the active avatar tries to perform any one of "Action" of passive permission data 13 in relation to the passive avatar. Several methods for detecting the action of the active avatar can be considered.

The generating unit 22 may perform determination from the flow of the immediately preceding action of the active avatar. For example, in a case where there is an action of bringing the right hand of the active avatar close to the passive avatar, the generating unit 22 detects that the action of the active avatar is an action for prompting an action combination of a handshake.

The generating unit 22 may perform the determination from the conversation of the active avatar to the passive avatar. For example, in a case where the active avatar makes a statement of "Let's Do Handshake" in relation to the passive avatar, the statement of the active avatar is detected as the action for prompting the action combination of the handshake.

The generating unit 22 may perform the determination from the action instruction input from the user in the active terminal 2. For example, in a case where there is an instruction of an action for the active avatar to shake hands with the passive avatar, the generating unit 22 detects that there is the action for the active avatar to prompt the action combination of the handshake.

The generating unit 22 may perform the determination from the feeling to be expressed on the active avatar. For example, in a case where the active avatar having a predetermined item corresponding to "Handshake", such as an object in the shape of a hand, approaches the passive avatar, the generating unit 22 detects that it is the action for the active avatar to prompt the action combination of the handshake. The item is an avatar costume, a tool, an aura, and the like, which are associated with the active avatar.

Here, whether or not it is the action for prompting the action combination may be determined on the premise of a position relationship between the active avatar and the passive avatar such as a distance between the active avatar and the passive avatar being a certain value or less, or the active avatar and the passive avatar facing each other. In addition, the position relationship between the active avatar and the passive avatar is suitably set in accordance with the type of action combination.

In a case where the passive permission data 13 includes the item of "Portion of Passive Avatar", the generating unit 22 may detect that the active avatar performs the action for prompting the action of the passive avatar by the active avatar focusing on an action in relation to a predetermined portion of the passive avatar when the action of the active avatar is detected.

In a case where the generating unit 22 detects the action from the active avatar with respect to the predetermined portion of the passive avatar, and the permission flag corresponding to the predetermined portion indicates permission in the passive permission data 13, in the moving image data, it is indicated that the passive avatar accepts the action of the active avatar. The predetermined portion is "Portion of Passive Avatar" that is set in the passive permission data. The generating unit 22 detects that the active avatar tries to perform any one of "Action" corresponding to "Portion of Passive Avatar" in relation to "Portion of Passive Avatar" of the passive permission data 13 of the passive avatar.

In a case where it is detected that the active avatar performs an action for prompting the action of the passive avatar, the generating unit 22 determines whether or not the passive avatar accepts the action of the active avatar with reference to the passive permission data 13. In a case where "Permission" is associated with the detected action in the passive permission data 13, the data for displaying the moving image data in which the passive avatar accepts the action of the active avatar is generated.

Figure 4:
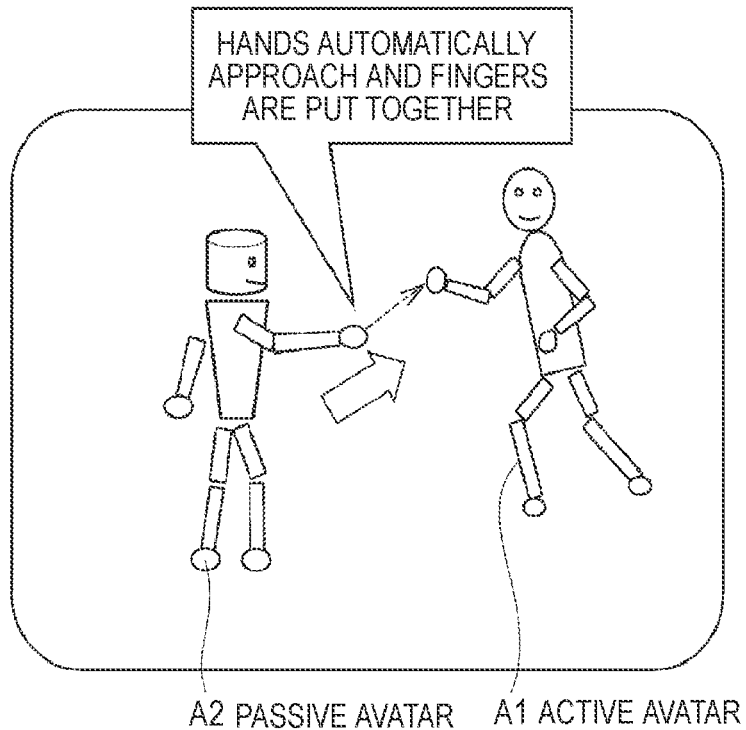
FIG. 4 is an example of capturing moving image data in which an active avatar and a passive avatar shake hands with each other.

In a case where the action for the active avatar to try to perform "Handshake" in relation to the passive avatar is detected, and "Permission" is associated with "Handshake" in the passive permission data 13, the generating unit 22, as illustrated in FIG. 4, generates the data for displaying the moving image data in which the active avatar and the passive avatar shake hands with each other. In the capture of a screen illustrated in FIG. 4, an active avatar A1 approaches a passive avatar A2 while holding out the right hand, and the distance is a predetermined value or less, in the moving image data, the active avatar A1 and the passive avatar A2 automatically approach each other, and shake hands with each other by putting fingers together.

In a case where the passive permission data 13 includes the item of "Portion of Passive Avatar", the generating unit 22 determines whether or not the passive avatar accepts the action of the active avatar in consideration of the portion of the passive avatar on which the active avatar acts. For example, in the example illustrated in FIG. 3, in a case where the active avatar tries to do a handshake with the right hand of the passive avatar, the passive avatar accepts the handshake, whereas in a case where the active avatar tries to hug the upper body of the passive avatar, the passive avatar denies the hug.

Here, in a case where an action for disturbing the action combination between the active avatar and the passive avatar is instructed in the active action data 11 or the passive action data 12, the generating unit 22 may ignore the action instructed in the active action data 11 or the passive action data 12, and may generate the data for displaying the moving image data in which the active avatar and the passive avatar shake hands with each other. The action for disturbing the action combination is the action instruction for the portion that is used in a case of performing the action combination.

For example, in a case where an action for the passive avatar to wave the right hand is designated in the passive action data 12 when the active avatar and the passive avatar do a handshake with the right hands, the generating unit 22 may allow the passive avatar to perform an action for shaking hands with the active avatar but not the action for waving the hand in the moving image data. On the other hand, in a case where an action for the passive avatar to wave the left hand is designated in the passive action data 12 when the active avatar and the passive avatar do a handshake with the right hands, the generating unit 22 may allow the passive avatar to perform an action for waving the left hand and shaking hands with the active avatar in the moving image data.

In a case where "Action" is associated with the passive permission data 13, and the passive avatar accepts the action of the active avatar, in the moving image data, in relation to the action of the active avatar, the passive avatar performs the action associated with the passive permission data. For example, in the example illustrated in FIG. 3, in a case where the active avatar requests a handshake to the passive avatar, in the moving image data, the passive avatar performs "Suggest Handshake with Left Hand". Specifically, the passive avatar holds out the left hand and waves the left hand up and down in relation to the active avatar holding out the right hand to prompt a handshake with the left hand. In addition, in a case where the active avatar requests high five to the passive avatar, in the moving image data, the passive avatar performs "Change Avatar Size in Response to Active Avatar", and performs high five with the active avatar.

In a case where the action from the active avatar with respect to the passive avatar is detected, and the permission flag in relation to the action is not set in the passive permission data 13, in the moving image data, it may be indicated that the active avatar perform the action in relation to the passive avatar. For example, in a case where "Denial" is set or "Pending" is set in the flag of the passive permission data 13, it is indicated that the active avatar asks the passive avatar to perform the action combination, in the moving image data.

Figure 5:
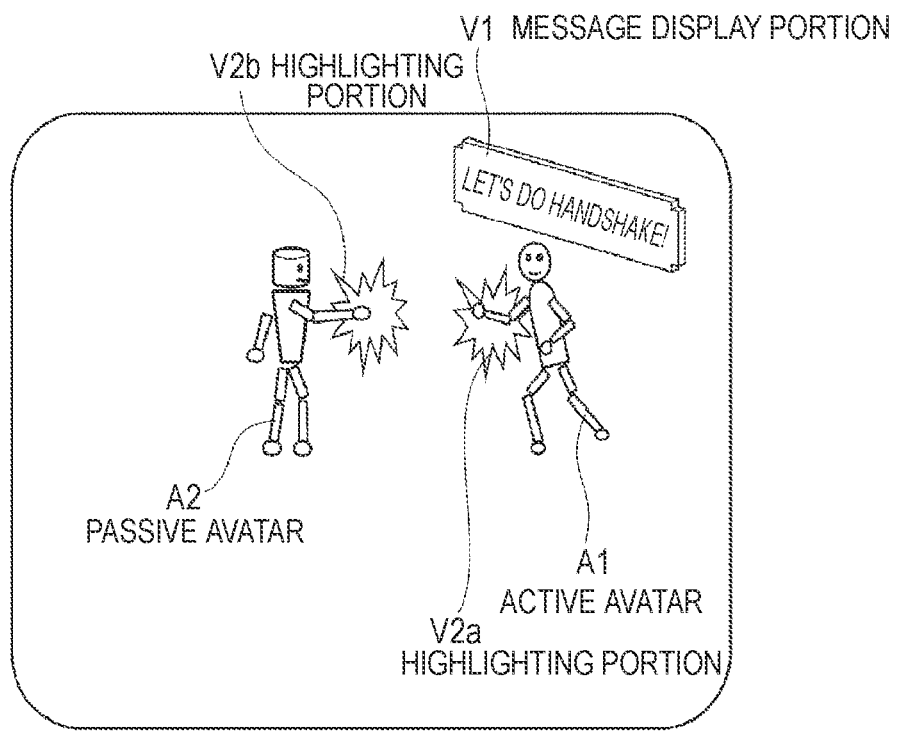
FIG. 5 is an example of capturing moving image data in which the active avatar requests a handshake to the passive avatar.

For example, as illustrated in the capture of the screen illustrated in FIG. 5, a message display portion V1 is provided in the moving image data. A message of "Let's Do Handshake!" is displayed in the message display portion V1, and thus, the fact that the active avatar A1 asks the passive avatar A2 to do a handshake is transmitted to the user of the passive terminal 3 through the moving image data. In addition, as another method, a highlighting portion V2a for highlighting the right hand of the active avatar A1 and a highlighting portion V2b for highlighting the right hand of the passive avatar A2 may be provided in the moving image data, and the fact that the active avatar A1 tries to do a handshake may be transmitted to the user of the passive terminal 3 through the moving image data. Only one of the active avatar A1 and the passive avatar A2 may be highlighted.

The user of the passive terminal 3 grasps that the active avatar A1 desires to shake hands with the passive avatar A2, with reference to the message or the highlight, and inputs an instruction of whether to permit or deny the request. In a case of permission, in the moving image data, the active avatar A1 and the passive avatar A2 shake hands with each other.

In a case where the action from the active avatar with respect to the passive avatar is detected, and the permission flag for the action of the passive permission data 13 indicates denial, in the moving image data, it is indicated that the passive avatar does not accept the action of the active avatar. Accordingly, the user of the active terminal 2 is capable of recognizing that the action is denied from the passive avatar.

For example, in a case where "Denial" is set in the passive permission data 13, in the moving image data, the active avatar and the passive avatar perform the action as if there is no other person without the active avatar and the passive avatar being entangled, such as the passive avatar avoiding the active avatar. Specifically, in a case where the active avatar requests a handshake to the passive avatar, and the passive avatar denies the request, in the moving image data, a state is indicated in which the active avatar and the passive avatar simply overlap with each other, such as the passive avatar avoiding the right hand that the active avatar holds out. Alternatively, in the moving image data, a state may be indicated in which the active avatar and the passive avatar move backwards from each other such that the active avatar and the passive avatar repel each other. In addition, in the moving image data, the message display portion of "Deny Handshake" may be displayed.

Generating processing of the generating unit 22 will be described with reference to FIG. 6. In FIG. 6, the avatar display device 1 generates the motion data 14 that is capable of rendering the virtual space, and the active terminal 2 and the passive terminal 3 generate the moving image data from the motion data.

First, the generating unit 22 waits for the detection of the action of the active avatar that is set in the passive permission data 13. In a case where the portion of the passive avatar is set in the passive permission data 13, it is also detected that the action of the active avatar is the action in relation to the portion of the passive avatar.

In a case where the action is not detected, in step S4, the generating unit 22 generates the motion data 14 in accordance with the active action data 11 and the passive action data 12.

In a case where the action is detected, in step S2, the generating unit 22 refers to the flag associated with the action in the passive permission data 13. In a case where the flag indicates permission, the processing proceeds to step S3, and in a case where the flag indicates denial, the processing proceeds to step S7.

In a case where the flag indicates permission, in step S3, the generating unit 22 determines whether or not the action is set in the passive permission data 13. In a case where the action is not set, in step S5, the generating unit 22 changes the active action data 11 and the passive action data 12, and generates the motion data 14 in which the active avatar and the passive avatar perform the action combination. By the motion data 14, the moving image data in which the active avatar and the passive avatar perform the action combination is regenerated by the active terminal 2 and the passive terminal 3, regardless of the active action data 11 and the passive action data 12.

In a case where the action is set, in step S5, the generating unit 22 changes the passive action data 12, and generates the motion data 14 in which the passive avatar performs the action set in the passive permission data 13. By the motion data 14, the moving image data in which the passive avatar performs the set action is regenerated by the active terminal 2 and the passive terminal 3, regardless of the passive action data 12. The active avatar may act in accordance with the active action data 11, may perform a predetermined action, or may temporarily stop.

In a case where the flag indicates denial, in step S7, the generating unit 22 changes the passive action data 12, and generates the motion data 14 in which the passive avatar does not accept the action. In the motion data 14, it may be indicated that the active avatar requests the action combination in the message or the highlight.

In a case where any processing of steps S4 to S7 is ended, the generating unit 22 returns to step S1.

According to such an avatar display system 5 according to the embodiment of the invention, in a case where the active avatar requests the action combination to the passive avatar, and the passive avatar permits the request, the moving image data in which the active avatar and the passive avatar perform actions corresponding to each other is displayed, regardless of the action instruction input from the active terminal 2 and the passive terminal 3. Accordingly, a detailed action instruction for performing the action combination is not input in the active terminal 2 and the passive terminal 3, and it is possible to easily attain the action combination in the virtual space. It is possible for the user performing communication in the virtual space to easily have an interaction with other avatars, regardless of an avatar manipulation skill.

Note that, in the embodiment of the invention, a case in which the action instruction with respect to the active avatar and the passive avatar acting in the virtual space is input in real time will be described, but the invention is not limited thereto. For example, the active avatar may act in accordance with the action instruction input in real time, the passive avatar may act in accordance with the action instruction input in advance, and an input timing of the action instruction is not limited. For example, in the moving image data of a handshaking event of an idol avatar (the passive avatar) acting in the virtual space, in a case where the active avatar approaches the idol and requests a handshake, and the handshake is permitted in the passive permission data 13, a state is indicated in which the active avatar and the idol shake hands with each other.

In the embodiment of the invention, a case in which the passive permission data 13 illustrated in the drawings is generated for each of the passive avatars has been described, but the invention is not limited thereto. For example, the passive avatar not including the passive permission data 13 may be controlled to deny all of the action combinations with the active avatar. In addition, the avatar display device 1 may retain data for setting whether or not to accept the action combination for each of the passive avatars. The passive avatar not accepting the action combination is easily specified, and thus, a processing cost of the generating unit 22 can be reduced.

In the passive permission data 13 illustrated in FIG. 3, a case in which the flag is set for each of the active action types and each of the portions of the passive avatar has been described, but the invention is not limited thereto. For example, the flag may be set for each of the active avatars. The passive permission data 13 may include specific information of the active avatar accepting the action combination or specific information of the active avatar not accepting the action combination. The specific information of the active avatar may be an identifier of an individual avatar, or may be the attribute of the active avatar, such as an occupation and intimacy insofar as the active avatar can be specified. In addition, in the passive permission data 13, the flag may be set for each of the specific information items of the active avatar, in addition to the active action type and the portion of the passive avatar.

In addition, in the passive permission data 13, the flag may be set for each environment of the virtual space, such as the attribute of an area for dividing the virtual space, time, and weather. For example, the flag may be set such that in an idol town, the passive avatar of which the occupation is an idol accepts all requests from the active avatars, wherein in areas other than the idol town, the passive avatar does not accept the requests from the active avatars at all.

In addition, in a case where denial is set in the flag, a condition in which the passive avatar accepts the action combination of the active avatar may be associated with the passive permission data 13. The condition, for example, is the intimacy of a predetermined level or more, having a predetermined item, being an avatar of a paid user, and the like. Such a condition is notified such that the user of the active avatar is capable of recognizing the condition. For example, the condition may be notified in the moving image data that is displayed on the active terminal 2, or may be notified to the active terminal 2 as a direct message.

As described above, in the passive permission data 13, it is possible for the avatar display device 1 to attain communication reflecting the intention of the passive avatar in the virtual space by defaulting in advance the condition in which the passive avatar accepts the request from the active avatar.

OTHER EMBODIMENTS

As described above, the statements and the drawings forming a part of this disclosure do not be understood to limit the invention even though described by the embodiments of the invention. Various alternative embodiments, Examples, and operational techniques are obvious for a person who skilled in the art from this disclosure.

For example, the avatar display device described in the embodiments of the invention may be configured on one hardware as illustrated in FIG. 2, or may be configured on a plurality of hardwares in accordance with the number of functions or processings. In addition, the avatar display device may be attained on the existing processing device together with other functions.

It is obvious that the invention includes various embodiments that are not described here. Accordingly, the technical scope of the invention is defined only by the matters used to specify the invention according to the claims appropriate from the above description.

REFERENCE SIGNS LIST

1 Avatar display device
2 Active terminal
3 Passive terminal
5 Avatar display system
10 Storage device
11 Active action data
12 Passive action data
13 Passive permission data
14 Motion data
20 Processing device
21 Acquiring unit
22 Generating unit
23 Output unit
30 Communication control device

The invention claimed is:

1. An avatar display device that is connected to an active terminal inputting an action instruction of an active avatar acting in a virtual space and a passive terminal inputting an action instruction of a passive avatar acting in the virtual space, and that displays moving image data of the virtual space on the active terminal and the passive terminal, the device comprising:
    a storage device storing passive permission data including a permission flag indicating permission or denial of the passive avatar in relation to an action from the active avatar with respect to the passive avatar,
    wherein the avatar display device is configured to output data for displaying the moving image data in which the passive avatar accepts the action of the active avatar on the active terminal and the passive terminal when the action from the active avatar with respect to the passive avatar is detected, and the permission flag indicates permission in the passive permission data,
    wherein the action of the active avatar prompts a corresponding response from the passive avatar so that the active avatar and the passive avatar act cooperatively, and
    wherein at least one of the action of the active avatar and the corresponding response from the passive avatar is adapted based on a current state of the passive avatar relative to the active avatar.

2. The avatar display device according to claim 1, wherein the passive permission data further includes the corresponding response of the passive avatar when the permission flag indicates permission, and
    in the moving image data, the passive avatar performs the corresponding response associated with the passive permission data in relation to the action of the active avatar.

3. The avatar display device according to claim 1, wherein when the action from the active avatar with respect to the passive avatar is detected, and the permission flag in relation to the action is not set in the passive permission data, in the moving image data, the passive avatar is prompted with a request to perform the corresponding response.

4. The avatar display device according to claim 1, wherein when the action from the active avatar with respect to the passive avatar is detected, and the permission flag for the action of the passive permission data indicates denial, in the moving image data, it is indicated that the passive avatar does not accept the action of the active avatar.

5. The avatar display device according to claim 1, wherein the passive permission data associates the permission flag indicating whether the passive avatar permits the action from the active avatar with the action from the active avatar with respect to the passive avatar in the virtual space, for each portion of the active avatar, and
when the action from the active avatar with respect to a predetermined portion of the passive avatar is detected, and the permission flag corresponding to the predetermined portion indicates permission in the passive permission data, in the moving image data, it is indicated that the passive avatar accepts the action of the active avatar.

6. An avatar display system comprising:
an active terminal inputting an action instruction of an active avatar acting in a virtual space; a passive terminal inputting an action instruction of a passive avatar acting in the virtual space; and an avatar display device that is connected to the active terminal and the passive terminal and that displays moving image data of the virtual space on the active terminal and the passive terminal,
wherein the active terminal and the passive terminal display the moving image data,
wherein the avatar display device includes:
a storage device storing passive permission data including a permission flag indicating permission or denial of the passive avatar in relation to an action from the active avatar with respect to the passive avatar,
wherein the avatar display device is configured to output data for displaying the moving image data in which the passive avatar accepts the action of the active avatar on the active terminal and the passive terminal when the action from the active avatar with respect to the passive avatar is detected, and the permission flag indicates permission in the passive permission data,
wherein the action of the active avatar prompts a corresponding response from the passive avatar so that the active avatar and the passive avatar act cooperatively, and
wherein at least one of the action of the active avatar and the corresponding response from the passive avatar is adapted based on a current state of the passive avatar relative to the active avatar.

7. An avatar display method to be used in an avatar display device that is connected to an active terminal inputting an action instruction of an active avatar acting in a virtual space and a passive terminal inputting an action instruction of a passive avatar acting in the virtual space, and that displays moving image data of the virtual space on the active terminal and the passive terminal, the method comprising:
storing passive permission data including a permission flag indicating permission or denial of the passive avatar in relation to an action from the active avatar with respect to the passive avatar in a storage device; and
outputting data for displaying the moving image data in which the passive avatar accepts the action of the active avatar on the active terminal and the passive terminal when the action from the active avatar with respect to the passive avatar is detected, and the permission flag indicates permission in the passive permission data,
wherein the action of the active avatar prompts a corresponding response from the passive avatar so that the active avatar and the passive avatar act cooperatively, and
wherein at least one of the action of the active avatar and the corresponding response from the passive avatar is adapted based on a current state of the passive avatar relative to the active avatar.

8. A non-transitory computer-readable storage medium containing instructions which, when executed by a processor, cause an avatar display device that is connected to an active terminal inputting an action instruction of an active avatar acting in a virtual space and a passive terminal inputting an action instruction of a passive avatar acting in the virtual space, and that displays moving image data of the virtual space on the active terminal and the passive terminal to:
store passive permission data including a permission flag indicating permission or denial of the passive avatar in relation to an action from the active avatar with respect to the passive avatar; and
output data for displaying the moving image data in which the passive avatar accepts the action of the active avatar on the active terminal and the passive terminal when the action from the active avatar with respect to the passive avatar is detected, and the permission flag indicates permission in the passive permission data,
wherein the action of the active avatar prompts a corresponding response from the passive avatar so that the active avatar and the passive avatar act cooperatively, and
wherein at least one of the action of the active avatar and the corresponding response from the passive avatar is adapted based on a current state of the passive avatar relative to the active avatar.

* * * * *